Patented May 19, 1942

UNITED STATES PATENT OFFICE 2,283,411

PROCESS FOR PREPARING STEROL DEGRADATION PRODUCTS

Hermann Bretschneider and László Fári, Budapest, Hungary, assignors to the firm Chinoin Gyogyszer És Vegyészeti Termékek Gyára R. T. (Dr. Kereszty & Dr. Wolf) Ujpest, Hungary, a corporation of Hungary No Drawing. Application June 24, 1939, Serial No. 281,050. In Hungary June 28, 1938

10 Claims. (Cl. 260—397.3)

This invention relates to a process for preparing sterol degradation products which process comprises the oxidation of sterols, sterol derivatives, by means of an oxygen containing gas, for instance by gaseous oxygen or by air. The oxidation is preferably carried out in the presence of catalysts. Compounds of the elements vanadium, chromium, manganese, iron, cobalt, nickel, i. e. elements of the atomic number 23–28 have been found as very suitable catalysts. Oxides of the above mentioned elements as vanadium-pentoxide, manganese-peroxide or other compounds, as for instance the potassium permanganate, preferably in dispersed form, can be used. As sterol or sterol derivate, the cholestenone, cholesterol, cholesterol ethers can be utilized. For instance, oxygen or air is passed into melted cholestenone, eventually mixed with a catalyst as vanadium-pentoxide or potassium permanganate; the oxidation mixture contains acidic and neutral constituents. The neutral constituents comprise compounds containing carbonyl group, for instance the corpus luteum hormone. Androstendione results at these oxidations only in negligible amounts.

The oxidation is carried out preferably between 120–160° C. In order to insure an intimate contact of the air or oxygen with the melted sterol or sterol derivative, the gas is introduced through a porous plate, for instance through a porous glass-plate of Jena. The duration of the oxidation is at least 20 hours, preferably 40 hours. The length of time for introducing air or oxygen, depends, of course, in great deal from external circumstances, as the amount of air passed pro unit of time, the dispersity degree of the air passing the melting, the dispersity of the catalyst, etc. The working up of the reaction mixture can be carried out in different ways. The cooled melting is, for instance, dissolved in a suitable solvent and filtered from the catalyst. The melting is, for instance, dissolved in benzol or petrol ether, filtered and the acidic degradation products are eliminated by shaking with diluted sodium hydroxide. Before separation of the useful oxidation products it is preferable to recuperate the unchanged cholestenone. This recuperation can be effected, for instance, by means of crystallization. The crystallization from acetone has been found very suitable for this purpose. The elimination of the cholestenone can be effected also by other ways. For instance the oxidation product, preferably after eliminating the acidic constituents, is subjected to a distribution between two immiscible organic solvents, one of these solvents being at any case an aqueous aliphatic alcohol. The neutral portions of the oxidation product are, for instance, dissolved in petrol ether, ligroin, benzine or in another aliphatic hydrocarbon and shaken with aqueous methanolic layer. It is preferable to repeat this distribution process several times, and at the repeated distributions to increase gradually the water content of the methanolic layer to a water content of 30%. It is preferable to use the countercurrent principle as described in details in our pending application Ser. No. 277,744 for the separating of the corpus luteum hormone from the oxidation mixtures of other provenience.

For the isolation of progesterone from the oxidation mixture also the following way can be used: the oxidation mixture, or preferably only the neutral parts of the oxidation mixture, is dissolved in a solvent immiscible with water, as for instance benzine, petrol ether, benzol. The solution is shaken with conc. hydrochloric acid. The progesterone passes into the hydrochloric acid layer from which it can be extracted—after dilution with much water—by means of benzol, petrol ether or other suitable solvents. This process of distribution between a solvent immiscible with water and between conc. hydrochloric acid can be applied to ether—already prepurified—fractions of the oxidation product, for instance to a fraction which has been obtained from the methanolic layer resulting from the distribution process disclosed above.

The enrichment of the progesterone can be effected also by chromatographic selection. For this purpose the raw oxidation product or the neutral fractions thereof or an in progesterone enriched fraction thereof can be used. As adsorbents the aluminium oxide, for instance the aluminium oxide secundum Brockmann has been found very suitable. As solvents, benzol, petrol ether, ligroin, or mixtures of these solvents can be used. The product which is to be purified is for instance dissolved in a mixture of benzol, petrol ether 1:2 and led through an aluminium oxide column. The developing of the chromatogram is effected preferably with the same solvents. The solvent dropping from the column is preferably collected in separate fractions, from which fractions progesterone can be obtained in different ways, for instance by crystallizing the remainder of the fractions from a suitable solvent, as for instance, from a mixture of benzol-petrol ether.

Further details of the isolating process as well as of the oxidation are to be found in the following examples.

Examples (1) 50 grams of cholestenone are fused by careful heating, then 12 grams of vanadium pentoxide are added to and, at about 170°, a vivid current of oxygen is led into the mixture. The yellow colour of the catalyst turns slowly to deep black. The reaction mixture is then cooled and, just before re-solidification, dissolved in ether. After the catalyst has been removed by filtration, the ethereal solution is washed subsequently with dilute alkali and water. The new neutral solution is evaporated and the residue thus obtained is re-dissolved in petrol ether. This solution is subjected to an exhaustive extraction with methyl alcohol of 90 per cent, by which the valuable corpus luteum hormone is collected in the methyl alcohol layer, while unchanged cholestenone remains in the petrol ether solution. For preparing crystalline hormone, the methyl alcohol is evaporated and the residue is extracted with benzene. The benzene extracts yield a residue that is then re-dissolved in a mixture of equal parts of benzene and benzine and from this solution the hormone is removed by repeated extractions with cold conc. hydrochloric acid. The united hydrochloric acid extracts are diluted with much water and re-extracted with ether. The residue of the ethereal layer is taken up in a mixture of one part of benzene and three parts of petrol ether and chromatographed on Brockmann's aluminium oxide. The solution passing the column is collected in several fractions, each fraction being evaporated separately. The first fractions contain substances which are least easily adsorbed by aluminum oxide. The fractions, however, contain only inconsiderable amounts of progesterone. The middle fractions are rich in progesterone and can be easily worked up by crystallization. The last fractions contain products which can be more easily adsorbed by aluminum oxide than progesterone. The column retains products that are most easily adsorbed by aluminum oxide. If these products are desired as well, other solvents than benzene-petrol ether may be used. The residues are brought to crystallization, the first fractions being readily soluble in petrol ether and rather difficult to crystallize because they contain only small amounts of progesterone, while the middle-fractions are less soluble in petrol ether and separate hormone-crystals readily. The progesterone thus obtained has M. P. 128–129° and $[\alpha]_D = +190°$.

(2) 500 grams of cholestenone are mixed with 10 grams of vanadium pentoxide and fused by heating in a glass flask. The inside temperature is kept at 120–130° and a vivid current of air is driven through the melt at a rate of 1–2 cubic metres per hour, the air being introduced through a Jena filtering plate of sintered glass (e. g. of no. G/1, of a diameter of 3 cm.), in order to secure thorough mixing. After 40 hours of oxidation the reaction is interrupted. The reaction-mixture is cooled, and, before re-solidification could take place, dissolved in 3 litres of petrol ether. The solution is filtered and, in order to remove the acidic components, washed 4 times with a 10 per cent. sodium hydroxide solution, using 250 ccms. of alkali each time. After washing with water until the reaction becomes neutral, extractions with methyl alcohol of 90 per cent. follow. These extractions consist in shaking seven times with 250 ccms. of methyl alcohol on each occasion. The petrol ether solution is evaporated and the residue (of about 380 grams) is dissolved in 380 ccms. of warm acetone and cooled by an ice-salt-mixture. Crystallization sets in, the crystals being unchanged cholestenone, weighing about 225 grams. The methyl alcoholic extractions are united, freed from methyl alcohol by evaporation, and the remaining aqueous solution containing resinous precipitates is re-extracted with benzene. The benzene extract renders an evaporation 55 grams of a residue, which is then dissolved in a mixture of 100 ccms. of benzene and 10 ccms. of petrol ether and extracted six times with conc. hydrochloric acid, using 100 ccms. of the acid on each occasion. Each of the hydrochloric acid extracts is diluted with much water, immediately after being separated. The united diluted extracts are then re-extracted with benzene, the benzene layer being washed until neutral reaction and then evaporated. The remaining residue is a pallid yellow oil, weighing about 4.5 grams. This is dissolved in 25 ccms. of a benzene petrol ether mixture of 1:1 and, in order to obtain crystalline corpus luteum hormone, is made to pass a glass tube filled with 50 grams of Brockmann's aluminium oxide, the column being washed with the same mixture. The first fractions dropping from the column (about 150 ccms.) are the richest in progesterone and yield on evaporation about 1.8–2.0 grams of a dry residue. This is recrystallized from petrol ether, rendering 0.7 gram of crystalline product of M. P. 115–117°. After recrystallization from a benzene-petrol ether mixture, 0.6 gram of progesterone is obtained. M. P. 128–129°, $[\alpha]_D = +196°$.

(3) 500 grams of cholestenone are mixed intimately with 5 grams of finely powdered potassium permanganate and then placed into a glass flask and fused by careful heating. The inside temperature is brought to 120–130° by means of an oil-bath and a vivid current of air is driven into the melt through a Jena glass filter plate. The vapour of the mixture has a peculiarly characteristic odour. After 20 hours, the oxidation is interrupted and the melt, after being cooled, is dissolved in 3 litres of petrol ether, before resolidification takes place. The manganese dioxide is filtered off and the petrol ether solution is washed 4 times with a 10 per cent sodium hydroxide solution, using 250 ccms. of the latter each time, in order to remove acidic components. After washing with water until neutral reaction, 7 extractions, each with 250 ccms. of 90 per cent. methyl alcohol, follow, after which the petrol ether is evaporated and brought to crystallization by chilling. The amount of recovered unchanged cholestenone can be raised to about 300 grams if the residue of the mother liquors of the above crystals is taken up in benzene and the solution is sent through an aluminium oxide column. From the benzene solution thus purified about 60 grams of cholestenone can be separated on evaporation.

The united methyl alcoholic extracts are freed from the alcohol content by evaporation and the remaining aqueous solution is extracted with benzene. This benzene solution leaves on evaporation about 17 grams of a residue, which is dissolved in subsequence in a mixture of 60 ccms. of benzene and 60 ccms. of petrol ether and extracted 5 times with ice-cold conc. hydrochloric acid, using 100 ccms. of the acid each time. Each hydrochloric acid extract is diluted with much water immediately and the united dilute hydrochloric acid solutions are re-extracted with benzene, the benzene layer being washed afterwards until neutral and then evaporated. About 3 grams of a pallid yellow oil are left. This is producing strong positive corpus luteum effect in animal test and is suited for therapeutic preparations.

For the preparation of crystalline corpus luteum hormone, this residue is dissolved in a benzene petrol ether mixture of 1:2 and sent through a tube filled with about 50 grams of Brockmann's aluminium oxide, the column being washed with the same solvent mixture. The chromatographed solution is taken up in several fractions, each fraction being evaporated separately and the respective residues are crystallized from petrol ether. About 0.12–0.18 grams of crystalline progesterone is obtained, showing, after one recrystallization, the M. P. 128–129° and $[\alpha]_D = +196°$.

(4) 500 grams of cholestenone are fused and subjected at 120–130° C. to a vivid current of air (1–2 m.$^3$ per hour) during 40 hours.

The working up is effected as described in the previous examples. 300 grams of cholestenone are regenerated. From the first portions of the solution dropping from the chromatogram column 1.1–1.5 grams of a remainder are obtained, on evaporation. This remainder is crystallized from a little petrol ether. One obtains 0.6 gram of crystals melting at 118–122°, these crystals resulting on further purification progesterone.

The technical measures given in the above standing examples as well as in the descriptive part of the specification can be used also in other sequences as described. The particular measures can be effected, if necessary, repeatedly. Some of the enriching processes described in the examples can also be omitted and, if wanted, by repeated effectuation of the other purification steps substituted. Thus, for instance, the distribution between benzol petrol ether (benzine) and between conc. hydrochloric acid can be substituted either by repeating the distribution process between petrol ether (benzine) and between aqueous methanol or by repeated effectuation of the chromatographic selection. In general, the disclosed circumstances of the reaction and of the isolating processes can be varied in several respects. One may use for instance instead of cholestenone other sterol derivatives too, or partially degradated derivatives of cholestenone, for instance those by-products which result after the progesterone has been isolated from the oxidation mixture.

What we claim is:

1. Process for preparing degradation products of sterols comprising the oxidation of cholestenone by a member of the group consisting of: oxygen gas, air, in the presence of vanadium-pentoxide at temperatures of 120–160° C., and separating said sterol degradation products from the formed oxidation mixture.

2. Process for preparing sterol degradation products comprising the oxidation of cholestenone by a member of the group consisting of oxygen gas, air, in the presence of vanadium-pentoxide at temperatures between 120 and 140°, the duration of the oxidation being at least 20 hours, and separating said sterol degradation products from the formed oxidation mixture.

3. In separating sterol degradation products from oxidation mixtures obtained by oxidizing cholestenone by means of an oxygen containing gas, the steps which comprise subjecting the neutral portions of the oxidation products to a distribution between two immiscible organic solvents, one of these solvents being an aqueous aliphatic alcohol.

4. Process as claimed in claim 3, characterized by effecting the distribution between a solvent belonging to the group: petroleum ether, ligroin, benzine, aliphatic hydrocarbons and between aqueous methanol, and separating progesterone from the aqueous methanol layer resulting from the distribution.

5. In isolating progesterone from cholestenone degradation products obtained by oxidizing cholestenone by an oxygen containing gas in the presence of catalysts, the steps which comprise subjecting the neutral portions of the oxidation products to a distribution between conc. hydrochloric acid and between a solvent immiscible with water, and separating the progesterone from the hydrochloric acid layer.

6. A process as claimed in claim 5, characterized by subjecting to the distribution a fraction of the oxidation products which remains in the aqueous methanolic layer obtained by distribution of the neutral portions of the oxidation products between a member of the group consisting of petrol ether, ligroin, benzine and between aqueous methanol.

7. In a process for isolating sterol degradation products from oxidation products obtained by the oxidation of cholestenone by means of an oxygen containing gas in the presence of a catalyst, the step which comprises subjecting to a chromotographic selection the fraction of the oxidation products obtained from the aqueous methanolic layer of a distribution process between a member selected from the group consisting of petroleum ether, ligroin, benzine, aliphatic hydrocarbons and between aqueous methanol.

8. Process as claimed in claim 7, characterized by utilizing aluminium oxide, as adsorbents, and as solvent, a member of the group consisting of: benzol, petroleum ether, benzine, ligroin, and mixtures of these solvents, the solvent dropping from the aluminium oxide column being collected in portions, the portions being worked up separately and the remainder of the portions being crystallized from mixtures of benzol-petroleum ether.

9. A process for preparing sterol degradation products containing cyclopentano-polyhydrophenanthrene nucleus and degraded in the side chain, comprising the oxidation of a member of the group consisting of cholesterol, cholesterol ethers, cholestenone by a member of the group consisting of oxygen gas and air, the oxidation being effected in the presence of a catalyst selected from the group consisting of oxides, peroxides, peracid salts of elements of atomic number 23 to 28 (vanadium, chromium, manganese, iron, cobalt, nickel) and comprising further the separation of said sterol degradation products from the formed oxidation mixture.

10. In separating sterol degradation products from oxidation mixtures obtained by oxidising cholestenone by means of an elementary oxygen containing gas, the steps which comprise subjecting the neutral portions of the oxidation products between a solvent belonging to the group: petroleum ether, ligroin, benzene, aliphatic hydrocarbons and between aqueous methanol, and separating progesterone from the aqueous methanol layer resulting from the distribution, this distribution process being effected repeatedly, at the first distribution methanol of 90% being utilized, at each of the following distributions the water content of the methanol being gradually increased to a water content of 30%.

HERMANN BRETSCHNEIDER.
LÁSZLÓ FÁRI.